(12) United States Patent
Yi et al.

(10) Patent No.: US 8,755,764 B2
(45) Date of Patent: Jun. 17, 2014

(54) EXTENDING THE RANGE OF VEHICULAR CELLULAR COMMUNICATIONS

(75) Inventors: Ki Hak Yi, York (CA); Mark A. Wisnewski, Stockbridge, MI (US); Eray Yasan, Canton, MI (US); Steven P. Schwinke, Plymouth, MI (US); Sethu K. Madhavan, Erie, PA (US)

(73) Assignee: General Motors LLC, Detroit, MI (US)

( * ) Notice: Subject to any disclaimer, the term of this patent is extended or adjusted under 35 U.S.C. 154(b) by 195 days.

(21) Appl. No.: 13/324,126

(22) Filed: Dec. 13, 2011

(65) Prior Publication Data

US 2013/0149985 A1 Jun. 13, 2013

(51) Int. Cl.
*H04M 11/04* (2006.01)

(52) U.S. Cl.
USPC .................. 455/404.1; 455/404.2; 455/456.1; 342/357.31; 342/450; 342/457; 701/465

(58) Field of Classification Search
CPC ...... H04W 76/007; H04W 4/22; H04W 11/04
USPC .......................... 455/404.1, 404.2, 430, 456.1; 342/357.31, 457, 450; 701/465
See application file for complete search history.

(56) References Cited

U.S. PATENT DOCUMENTS

| | | | | |
|---|---|---|---|---|
| 6,952,181 B2 * | 10/2005 | Karr et al. | ...................... | 342/457 |
| 7,274,332 B1 * | 9/2007 | Dupray | .......................... | 342/450 |
| 7,525,484 B2 * | 4/2009 | Dupray et al. | ................. | 342/450 |
| 7,574,195 B2 * | 8/2009 | Krasner et al. | .............. | 455/404.2 |
| 7,714,778 B2 * | 5/2010 | Dupray | ..................... | 342/357.31 |
| 7,764,231 B1 * | 7/2010 | Karr et al. | ....................... | 342/457 |
| 7,903,029 B2 * | 3/2011 | Dupray | .......................... | 342/457 |
| 7,904,053 B2 * | 3/2011 | Krasner et al. | .............. | 455/404.2 |
| 8,032,153 B2 * | 10/2011 | Dupray et al. | .............. | 455/456.1 |
| 8,082,096 B2 * | 12/2011 | Dupray | .......................... | 701/465 |
| 8,135,413 B2 * | 3/2012 | Dupray | .......................... | 455/456.1 |
| 2007/0167147 A1 * | 7/2007 | Krasner et al. | .............. | 455/404.2 |
| 2008/0268838 A1 * | 10/2008 | Zufall et al. | ................... | 455/430 |
| 2009/0286504 A1 * | 11/2009 | Krasner et al. | .............. | 455/404.1 |
| 2013/0149985 A1 * | 6/2013 | Yi et al. | ...................... | 455/404.1 |

* cited by examiner

*Primary Examiner* — William D Cumming
(74) *Attorney, Agent, or Firm* — Anthony Luke Simon; Reising Ethington P.C.

(57) ABSTRACT

A system and method for extending the cellular range of communications using a vehicle telematics unit. The system includes the vehicle telematics unit which is connected with other vehicle hardware and includes wireless cellular capability for communicating from the vehicle to a call center or other facilities via a wireless communication system. The method carried out by the system includes identifying a cellular base station in wireless communication with a vehicle telematics unit; attempting an emergency call via the identified cellular base station using the vehicle telematics unit; determining that a forward link portion of a cellular signal between the vehicle telematics unit and the identified cellular base station lacks sufficient strength to place the attempted emergency call; and transmitting emergency communications via the identified cellular base station using a reverse link portion of the cellular signal based on the determination.

20 Claims, 3 Drawing Sheets

EXTENDING THE RANGE OF VEHICULAR CELLULAR COMMUNICATIONS

TECHNICAL FIELD

What follows relates to wireless communications and more particularly to cellular communications at a vehicle.

BACKGROUND

Cellular communications involve establishing a wireless communication channel between a wireless device and one or more stationary base stations. The wireless communication channel generally includes a forward link portion for sending information from the base station to the wireless device and a return link portion for sending information from the wireless device to the base station. Both the forward and return link portions are used to establish viable wireless communication channel with a wireless communications system. During the process of establishing the wireless communication channel, the wireless device can determine if the signals broadcast by the base stations meet the minimum quality needed to establish the forward and reverse link portions. However, if the signals broadcast by the base stations lack support for either the forward link portion or the reverse link portion, the wireless device may determine that service is unavailable. Sometimes the wireless device makes this determination while located at or just beyond the distance threshold at which establishing the wireless communications channel is possible. During circumstances under which the wireless device may decide that no service is possible, it would be helpful to extend the range of cellular communications, such as when the wireless device is located near the threshold of the broadcast signal range.

SUMMARY

According to an embodiment of the disclosure, there is provided a method of carrying out communications using a vehicle telematics unit. The method includes identifying a cellular base station in wireless communication with a vehicle telematics unit; attempting an emergency call via the identified cellular base station using the vehicle telematics unit; determining that a forward link portion of a cellular signal between the vehicle telematics unit and the identified cellular base station lacks sufficient strength to place the attempted emergency call; and transmitting emergency communications via the identified cellular base station using a reverse link portion of the cellular signal based on the determination.

According to another embodiment of the disclosure, there is provided a method of carrying out communications using a vehicle telematics unit. The method includes receiving a forward link portion of a cellular signal at a vehicle; sampling the received forward link portion of the cellular signal at the vehicle; determining that an attempted emergency call placed at the vehicle has failed; and establishing a reverse link portion of the cellular signal using the sampled forward link portion.

According to yet another embodiment of the disclosure, there is provided a method of carrying out communications using a vehicle telematics unit. The method includes identifying a cellular base station in wireless communication with a vehicle telematics unit; sampling a forward link portion of the cellular signal received from the identified cellular base station; inititating an emergency call using the vehicle telematics unit; determining that the signal strength of the forward link portion of the cellular signal falls below a threshold for successful communications; and transmitting the sampled forward link portion of the cellular signal to the identified cellular base station to establish a reverse link portion of the cellular signal with the identified cellular base station.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
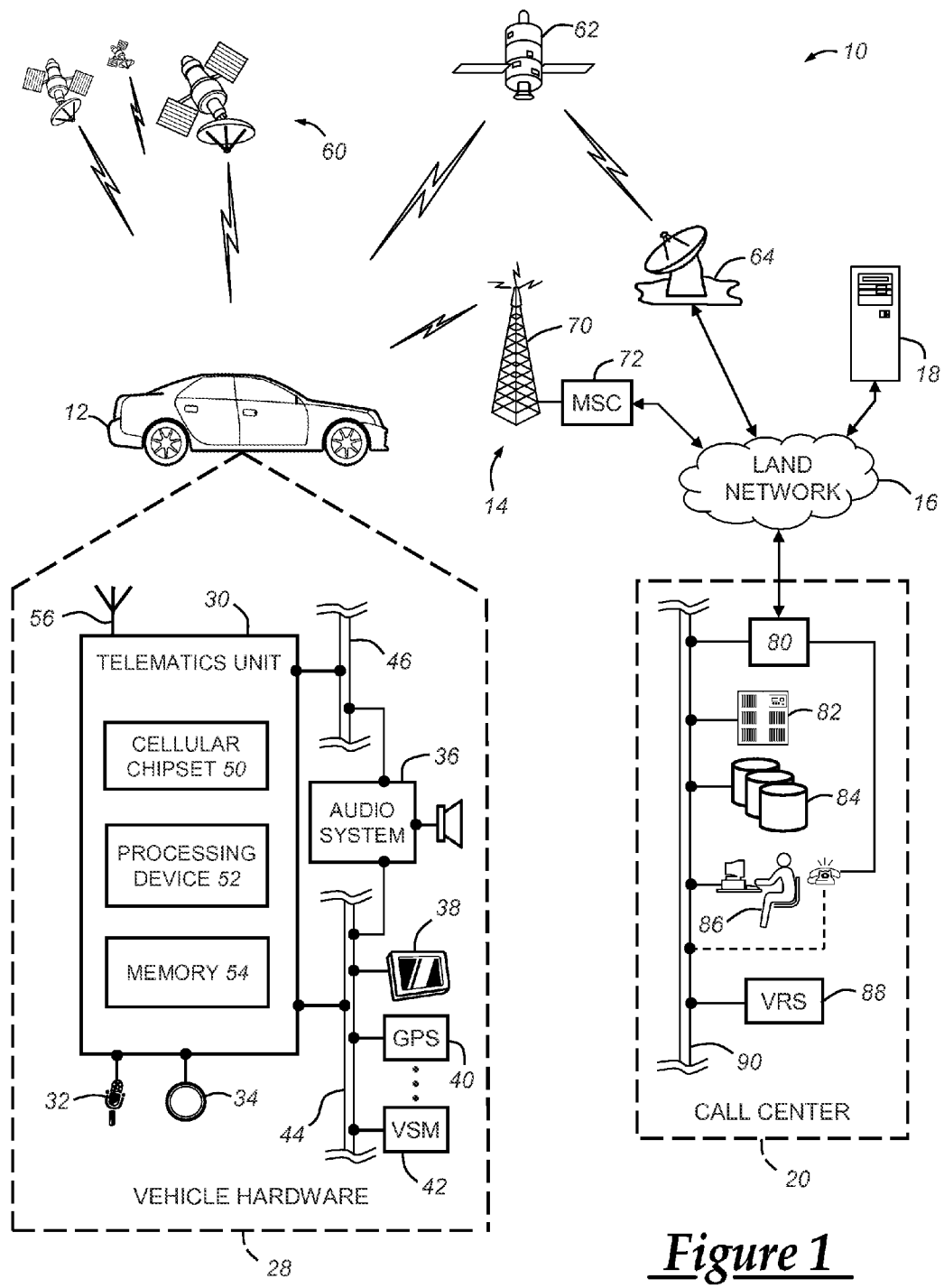
FIG. 1 is a block diagram depicting an embodiment of a communications system that is capable of using the method disclosed herein.

The method described below involves transmitting information using a cellular communications system even though the quality of a wireless signal received at a wireless device from a cellular base station falls below a threshold. Using cellular communications standards, the wireless device can decide whether it is possible to successfully establish a wireless communication channel having a forward link portion and a reverse link portion between the device and the base station. Cellular communication standards include a number of generally-agreed-upon design standards and specifications that attempt to unify the hardware/software elements of a cellular communications system, such as those implemented by the Third Generation Partnership Program (3GPP). Such communication standards can include a number of thresholds to make a decision whether service is possible. Using a wireless signal broadcast by the base station, the wireless device can receive or establish a forward link portion of the wireless communication channel. If the broadcast signal is not detectable or is weaker than the thresholds specified in the cellular communication standards, then the wireless device can determine that the wireless communication channel is not feasible.

Even though the wireless signal broadcast by the base station may not be strong enough to meet one or more thresholds set forth in the cellular communication standard, the base station may still support wireless communications from the wireless device. For instance, when the wireless device either fails to detect a wireless signal from the base station or the detected signal is below a threshold of the cellular communication standard, it is possible to direct the wireless device to lower the threshold and attempt to establish the wireless communication channel using the lower threshold. But by doing so the wireless device may no longer conform to the cellular communication standards.

It is also possible to sample the wireless signal received from one or more base stations and store the result of the sampling for later use. When the wireless device no longer detects a signal from the base station or the detected signal is below a threshold of the cellular communication standard, the wireless device can access one or more stored sampling results and transmit the sampled or discrete signal to the base station from which it was received/sampled to establish at least a part of the wireless communication channel—for instance, the reverse link portion—and communicate information from the wireless device to a wireless communication system via the base station. Using the reverse link portion of the wireless communication channel in such a way may be possible because the transceiver carried by the wireless device can sometimes transmit a signal more powerful than that received from the base station. So even though the forward link portion may not be sustainable, the wireless device can transmit information to the base station using the reverse link portion.

The ability to transmit information using the reverse link portion can be even more pronounced in applications involving a vehicle having an in-vehicle wireless device, such as a vehicle telematics unit, that can establish the wireless communication channel via an antenna located on the roof of the vehicle. The height of the rooftop antenna can augment the strength of the reverse link portion and enable communications between the vehicle and the base station at even greater distances than that possible using a handheld wireless device. In any event, the wireless communication channel (or a portion of it, such as the reverse link portion) can be established in areas serviced by a weak signal from the base station while the controlling cellular communication standard(s) remain adhered to. During emergency situations—such as when the user of a wireless device attempts to place an emergency call in areas having the weak signal—the reverse link portion of the wireless communication channel can be used to transmit information to relevant recipients (e.g. PSAP or call center).

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 uses cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
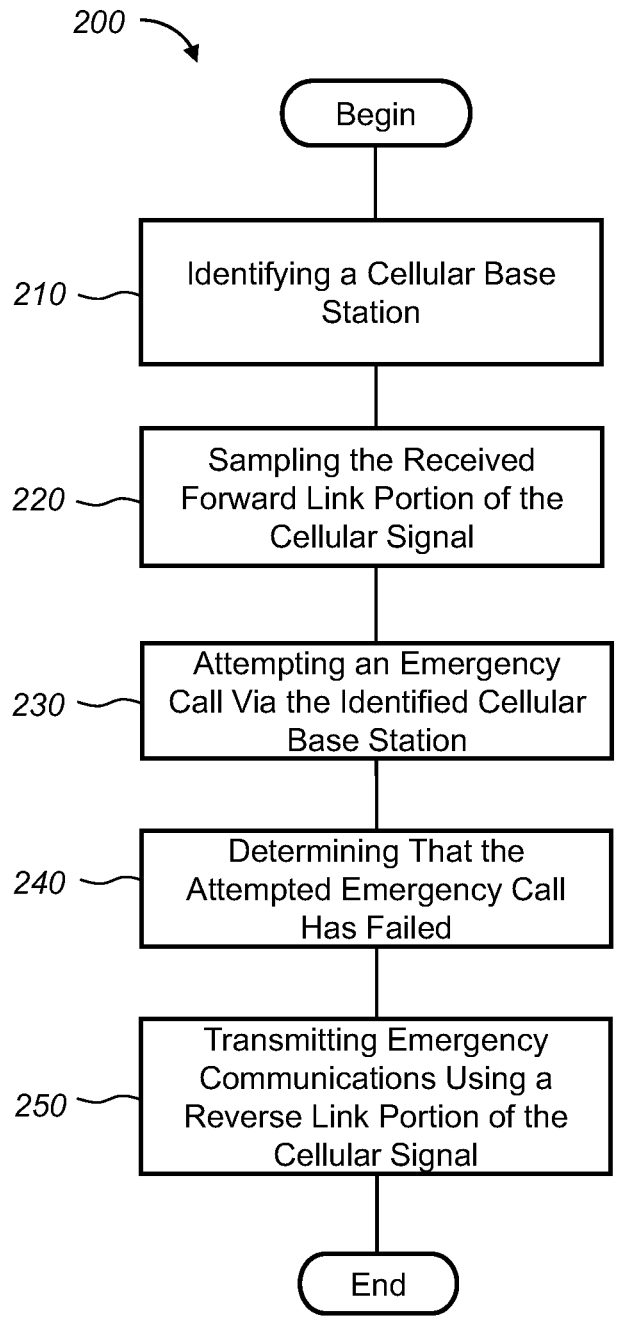
FIG. 2 is a flow chart depicting a method of extending the range of vehicular cellular communications.

Turning now to FIG. 2, there is shown a method 200 of carrying out communications using the vehicle telematics unit 30. The method 200 begins at step 210 by identifying a cellular base station, such as cell tower 70, in wireless communication with the vehicle telematics unit 30. The vehicle telematics unit 30 can detect and/or receive a forward link portion of the wireless communication channel (e.g. cellular signal) comprising radio frequency (RF) signals broadcast from one or more cellular base stations. The received signals can include a variety of information that can identify the cellular base station and be used to set up a wireless communication channel or cellular link between the telematics unit and the base station. This information can include a system identification number (SID), network identification number (NID), received signal strength indicator (RSSI), the time and date, or other such information known by those skilled in the art. The received RF signals can also be described as a forward link portion of a cellular signal, which can be used as an acquisition signal for establishing the wireless communication channel between the vehicle telematics unit 30 and the cellular base station. As part of the RF signal, the cellular base station can also broadcast layer 3 (L3) signaling messages to be used by the vehicle telematics unit 30 for establishing the wireless communication channel. The method 200 proceeds to step 220.

At step 220, the received forward link portion of the cellular signal is sampled at the vehicle 12. As part of receiving the forward link portion broadcast by the cellular base station, this signal can be sampled and the results of this sampling can be stored at the vehicle 12. Additionally, the sampling results can be identified by the base station from which they were obtained. As a result, the sampling results can be later accessed according to the cellular base station that generated the forward link portion. To help identify cellular base stations, a portion of non-volatile memory can be dedicated to storing the identities of each base station from which forward link portions have been received and/or sampled. These identities can be included in a list of most-recently-attached (MRA) cellular base stations that the vehicle telematics unit 30 has communicated with. This will be discussed below in more detail. In one implementation, the MRA list can be a list of most-recently camped-on cellular base stations, such as can be generated by wireless devices using CDMA technology. The period of the sampled results may vary, but in one exemplary implementation the vehicle telematics unit 30 can receive the forward link portion of the wireless communication channel via antenna 56 and sample at least three L3 frames using the electronic processing device 52. The result of this sampling can then be recorded in non-volatile memory at the vehicle 12, such as the one or more digital memory devices 54. The forward link portion received at the vehicle 12 can be passed through an analog-to-digital filter (A/D), the result of which can then be sent to the memory devices 54. As part of recording the sampled results at the vehicle 12, the vehicle telematics unit 30 can associate the results with the identity of the cellular base station that broadcast the forward link portion sampled/recorded. In one example, the sampled results can be identified according to a cell tower identifier (Cell ID) in GSM systems. In another example, the sampled results can be identified using a base station identification number (BID). The method 200 proceeds to step 230.

At step 230, an emergency call is attempted via the identified cellular base station using the vehicle telematics unit 30. During an emergency, an occupant of the vehicle 12—or even the vehicle 12 itself—can decide to place a call using the vehicle telematics unit 30. This call can be initiated by the occupant pressing the button 34 inside the vehicle 12 or by the vehicle telematics unit 30 based on data received over the vehicle bus 44 from one or more VSMs 42, to name but a couple examples. After the emergency call is attempted or initiated, the vehicle telematics unit 30 can attempt to identify a cellular base station broadcasting the strongest signal and select that base station for placing the emergency call. The method 200 proceeds to step 240.

At step 240, it is determined that the attempted emergency call placed at the vehicle 12 has failed. This can be determined when the vehicle telematics unit 30 does not detect the presence of a viable forward link portion of the wireless communication channel. Or if the forward link portion of the cellular signal is present, it may be of low quality, such as having a signal strength value below a threshold agreed on by established cellular communications standards for successful communications. In an exemplary implementation, the vehicle telematics unit 30 can attempt to place the emergency call. By doing so, the vehicle telematics unit 30 can attempt to locate one or more cellular base stations the unit 30 can communicate with. If the vehicle telematics unit 30 locates a cellular base station and the wireless signal received from that base station is above a threshold, then the unit 30 can establish communications via both the forward and reverse link portions of the wireless communication channel and the emergency call can be connected from the vehicle 12 to the cellular base station and ultimately to the PSAP or call center 20. However, the vehicle telematics unit 30 may not detect a wireless signal from a cellular base station or the signal strength may be below a threshold beyond which the forward link portion of the wireless communication channel cannot adequately carry information. One exemplary value for this threshold can be −104 dB and when the signal strength of the forward link portion of the cellular signal falls below this value, communications from the cellular base station may not be possible. If the forward link portion of the wireless/cellular signal is not detected/present or if all of the wireless/cellular signals received by the vehicle telematics unit 30 fall below the threshold, then the method proceeds to step 250.

At step 250, emergency communications are transmitted via the identified cellular base station using a reverse link portion of the cellular signal. Once the vehicle telematics unit 30 has determined that the forward link portion of the cellular signal is either not available or of poor quality, the unit 30 can attempt to send information from the vehicle 12 to the cellular base station using only the reverse link portion of the wireless communication channel. This can begin by accessing the stored list of MRA cellular base stations, choosing one of the base stations included on the stored list, and obtaining the sampled result for the chosen base station. That is, the vehicle telematics unit 30 can determine that even though the forward link for a particular base station is not present or is of poor quality, the vehicle 12 may be near enough to this base station that communications using the reverse link portion may be possible. Making this determination can rely on a number of factors or data gathered by the vehicle 12. For instance, the vehicle telematics unit 30 can obtain a wide variety of location-related information—both for the vehicle 12 and for the cellular base station. This can include the speed and direction of the vehicle 12, the location of the vehicle 12, the location of the cellular base station, the time of the last cellular base station contact, and/or the current time and day, all of which can be used individually or in specific combinations to determine the likelihood that the vehicle telematics unit 30 is close enough to a particular cellular base station to communicate via the reverse link portion of the wireless communication channel.

For example, if the vehicle telematics unit 30 chooses a cellular base station included on the MRA list, determines that the last contact with the base station occurred five minutes ago, and detects that the vehicle 12 is moving slowly (e.g. less than 5 miles per hour), the unit 30 can determine that it may be possible to connect to that base station. On the other hand, if the vehicle telematics unit 30 determines that the last contact with the chosen base station was over an hour ago and the vehicle 12 is travelling at 55 miles per hour, then the unit 30 can decide that communication is not possible or that another base station should be chosen from the MRA list. In another example, the vehicle telematics unit 30 can determine the location of the cellular base station from the forward link portion received from the base station. The determined location could then be stored at the vehicle 12 along with a time at which the location was determined. Later, the present location of the vehicle 12 could be compared with the location of the cellular base station and depending on other variables, such as the amount of time that has passed since determining the base station location and/or the speed/distance travelled by the vehicle 12 relative to the amount of time has passed, it can be determined whether or not communications via the reverse link portion of the wireless communication channel is possible.

Once a cellular base station has been chosen, the previously-sampled results associated with that base station can be obtained and transmitted from the vehicle telematics unit 30 to the chosen base station. In one embodiment, a reverse link portion of the wireless communication channel is established using the sampled forward link portion. This can be carried out by transmitting the sampled forward link portion of the wireless communication channel to the identified cellular base station to establish a reverse link portion of the wireless communication channel with the identified cellular base station. The cellular base station can recognize the contents of this transmission and based on the contents receive communications from the vehicle telematics unit 30 as though a valid forward link portion of the wireless communication channel is in place between the vehicle 12 and the cellular base station. In an exemplary implementation, the vehicle telematics unit 30 can determine that only one cellular base station is available for an emergency call and the strength of the forward link portion is less than −104 dB. The vehicle telematics unit 30 can then access the MRA list and determine if the only cellular base station available is included on the list. If so, the vehicle telematics unit 30 can obtain the sampled results for the only available base station and transmit the sampled results to that base station. Even though the forward link portion is less than −104 dB, the vehicle telematics unit 30 can transmit a stronger signal or even be programmed to increase its power during such a transmission. In this implementation, the vehicle telematics unit 30 can transmit through antenna 56, which can have a power of 0.25 watts thereby generating a signal of −24 dB. This signal is stronger than the −104 dB of the forward link portion. Upon establishing the reverse link portion, the vehicle telematics unit 30 can send a data burst that includes a variety of information, such as vehicle location, vehicle identity, or other data helpful in an emergency. The method 200 then ends.

Figure 3:
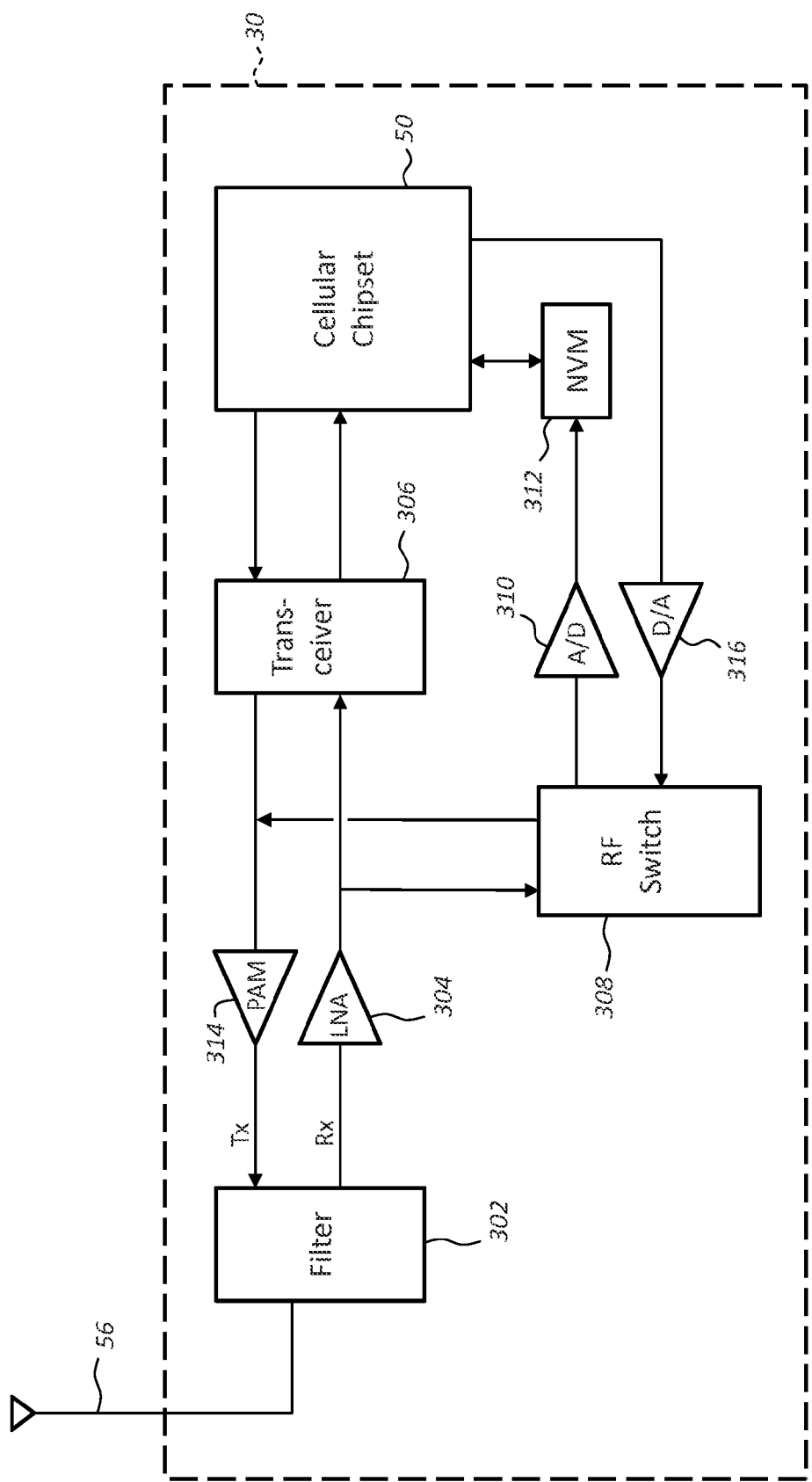
FIG. 3 is a block diagram depicting an embodiment of a vehicle telematics unit capable of using the method disclosed herein.

Turning to FIG. 3, an exemplary implementation of the vehicle telematics unit 30 is shown that is capable of carrying out at least a portion of the methods described herein. The vehicle telematics unit 30 can receive the forward link portion of the cellular signal via the antenna 56 and pass the signal through one or more filters 302 known to those in the art. The forward link portion can then pass through a low-noise amplifier 304 before receipt and processing by a transceiver 306 and the cellular chipset 50. During normal operation (e.g. an emergency call has not been initiated), the forward link portion can be directed from the LNA 304 through an RF switch 308 to be sampled using an A/D converter 310, the output of which can be saved in a non-volatile memory device 312. The wireless communication channel can be carried out between the filter(s) 302 and the chipset 50 by passing the received forward link portion through the LNA 304 and the transceiver 306 as well as transmitting communications for the reverse link via the transceiver 306 and a pulse amplitude modulator (PAM) 314. When an emergency call is initiated, the cellular chipset 50 can obtain a sampled result from the non-volatile memory device 312, pass the sampled result through a digital/analog (D/A) converter 316, the RF switch 308, the PAM 314, and transmit the sampled result to the cellular base station as described above.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of carrying out communications using a vehicle telematics unit, comprising the steps of:
   (a) identifying a cellular base station in wireless communication with a vehicle telematics unit;
   (b) attempting an emergency call via the identified cellular base station using the vehicle telematics unit;
   (c) determining that a forward link portion of a cellular signal between the vehicle telematics unit and the identified cellular base station lacks sufficient strength to place the attempted emergency call; and
   (d) transmitting emergency communications via the identified cellular base station using a reverse link portion of the cellular signal based on the determination in step (c).

2. The method of claim 1, further comprising the step of identifying the forward link portion using a cellular ID (CID) or a base station identification number (BID).

3. The method of claim 1, wherein the emergency communications are transmitted via an antenna located on the roof of a vehicle.

4. The method of claim 1, further comprising the step of determining whether to use the reverse link portion based on location-related information that is gathered by the vehicle telematics unit.

5. The method of claim 1, further comprising the step of sampling the forward link portion of the cellular signal and storing the results at the vehicle.

6. The method of claim 5, wherein the step of sampling the forward link portion takes place before step (c).

7. The method of claim 5, further comprising the step of establishing the reverse link portion of the cellular signal using the stored results.

8. The method of claim 5, further comprising the step of identifying the stored results based on the identity of the cellular base station.

9. The method of claim 5, wherein a sampling period is greater than three layer 3 (L3) frames.

10. The method of claim 5, further comprising the step of maintaining at the vehicle a list of most-recently-attached (MRA) cellular base stations.

11. The method of claim 10, further comprising the steps of:
    accessing the MRA list;
    choosing a cellular base station included on the MRA list;
    obtaining the sampled results for the chosen cellular base station.

12. The method of claim 11, further comprising the step of choosing the cellular base station based on a last contact time, a distance between the vehicle and the cellular base station, or both.

13. A method of carrying out communications using a vehicle telematics unit, comprising the steps of:
    (a) receiving a forward link portion of a cellular signal at a vehicle;
    (b) sampling the received forward link portion of the cellular signal at the vehicle;
    (c) determining that an attempted emergency call placed at the vehicle has failed; and
    (d) establishing a reverse link portion of the cellular signal using the sampled forward link portion.

14. The method of claim 13, further comprising the step of determining whether to establish the reverse link portion based on location-related information that is gathered by the vehicle telematics unit.

15. The method of claim 13, further comprising the step of identifying the sampled forward link portion based on the identity of a cellular base station and storing the sampled forward link portion at the vehicle.

16. The method of claim 13, further comprising the step of maintaining at the vehicle a list of most-recently-attached (MRA) cellular base stations.

17. The method of claim 16, wherein the list of MRA cellular base stations further comprises a list of most-recently camped-on cellular base stations.

18. The method of claim 16, further comprising the steps of:
    accessing the MRA list;
    choosing a cellular base station included on the MRA list;
    obtaining the sampled results for the chosen base station; and
    transmitting the sampled results to the chosen cellular base station.

19. The method of claim 13, further comprising the steps of increasing the power of an antenna based on step (c) and transmitting information over the reverse link portion via the antenna using the increased power.

20. A method of carrying out communications using a vehicle telematics unit, comprising the steps of:
    (a) identifying a cellular base station in wireless communication with a vehicle telematics unit;
    (b) sampling a forward link portion of the cellular signal received from the identified cellular base station;
    (c) inititating an emergency call using the vehicle telematics unit;
    (d) determining that the signal strength of the forward link portion of the cellular signal falls below a threshold for successful communications; and
    (e) transmitting the sampled forward link portion of the cellular signal to the identified cellular base station to establish a reverse link portion of the cellular signal with the identified cellular base station.

* * * * *